US009924510B2

(12) United States Patent
Azizi et al.

(10) Patent No.: US 9,924,510 B2
(45) Date of Patent: Mar. 20, 2018

(54) WIRELESS DEVICE, METHOD, AND COMPUTER READABLE MEDIA FOR ORTHOGONAL FREQUENCY DIVISION MULTIPLE ACCESS (OFDMA) ALLOCATIONS BASED ON A BASIC TONE RESOURCE UNIT OR ENTIRE SUB-CHANNEL

(71) Applicant: Intel IP Corporation, Santa Clara, CA (US)

(72) Inventors: Shahrnaz Azizi, Cupertino, CA (US); Robert J. Stacey, Portland, OR (US); Eldad Perahia, Portland, OR (US); Thomas J. Kenney, Portland, OR (US); Chittabrata Ghosh, Fremont, CA (US); Po-Kai Huang, West Lafayette, IN (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/670,924

(22) Filed: Mar. 27, 2015

(65) Prior Publication Data
US 2016/0165598 A1 Jun. 9, 2016

Related U.S. Application Data

(60) Provisional application No. 62/087,173, filed on Dec. 3, 2014, provisional application No. 62/109,464, filed on Jan. 29, 2015.

(51) Int. Cl.
*H04L 5/00* (2006.01)
*H04W 72/04* (2009.01)
*H04W 84/12* (2009.01)

(52) U.S. Cl.
CPC ....... *H04W 72/0446* (2013.01); *H04L 5/0037* (2013.01); *H04W 72/042* (2013.01);
(Continued)

(58) Field of Classification Search
CPC .................. H04W 72/0446; H04L 5/0007
See application file for complete search history.

(56) References Cited

U.S. PATENT DOCUMENTS

2009/0262710 A1* 10/2009 Doi ..................... H04W 56/001
370/336
2010/0302984 A1* 12/2010 Rege ..................... H04H 20/67
370/312

(Continued)

FOREIGN PATENT DOCUMENTS

DE 102015118116 A1 6/2016
WO WO-2016089538 A1 6/2016

OTHER PUBLICATIONS

"German Application Serial No. 102015118116.9, Voluntary amendment dated Mar. 11, 2016", 10 pgs.

(Continued)

*Primary Examiner* — Parth Patel
(74) *Attorney, Agent, or Firm* — Schwegman Lundberg & Woessner, P.A.

(57) ABSTRACT

Wireless devices, methods, and computer readable media are disclosed. A high-efficiency wireless local-area network (HEW) master station is disclosed. The HEW master station may include circuitry. The circuitry may be configured to generate one or more resource allocations of a bandwidth for one or more HEW stations. Each resource allocation for a first portion of the bandwidth may be a multiple of a basic resource allocation or the entire first portion of the bandwidth. There may be only one resource allocation for a second portion of the bandwidth that is at least as large as the first portion of the bandwidth. In some embodiments, each (Continued)

resource allocation for the second portion of the bandwidth may be a multiple of the basic resource allocation or the entire second portion of the bandwidth.

21 Claims, 12 Drawing Sheets

(52) U.S. Cl.
CPC ....... *H04W 72/0413* (2013.01); *H04L 5/0007* (2013.01); *H04W 72/0453* (2013.01); *H04W 84/12* (2013.01)

(56) References Cited

U.S. PATENT DOCUMENTS

| | | | |
|---|---|---|---|
| 2011/0096747 A1* | 4/2011 | Seok | H04W 72/04 370/329 |
| 2011/0235593 A1 | 9/2011 | Gong et al. | |
| 2012/0327871 A1* | 12/2012 | Ghosh | H04L 5/0023 370/329 |
| 2013/0286959 A1* | 10/2013 | Lou | H04W 72/04 370/329 |
| 2014/0079003 A1 | 3/2014 | Noh et al. | |
| 2014/0269387 A1* | 9/2014 | Kim | H04W 76/023 370/252 |
| 2014/0328236 A1* | 11/2014 | Merlin | H04B 7/2621 370/311 |
| 2015/0334708 A1* | 11/2015 | Lee | H04W 72/0446 370/329 |
| 2015/0349995 A1* | 12/2015 | Zhang | H04L 5/0048 375/295 |
| 2015/0365195 A1* | 12/2015 | Yang | H04L 27/2634 375/295 |
| 2015/0365203 A1* | 12/2015 | Suh | H04L 5/0007 370/330 |
| 2016/0050672 A1* | 2/2016 | Chen | H04W 72/06 370/329 |
| 2016/0057754 A1* | 2/2016 | Azizi | H04W 28/20 370/329 |
| 2016/0080043 A1* | 3/2016 | Tian | H04B 7/022 375/267 |
| 2016/0080122 A1* | 3/2016 | Oh | H04L 5/0007 370/330 |
| 2016/0088599 A1* | 3/2016 | Yang | H04W 72/044 370/329 |
| 2016/0100408 A1* | 4/2016 | Hedayat | H04L 65/4076 370/329 |
| 2016/0105304 A1* | 4/2016 | Kwon | H04L 27/2665 370/338 |
| 2016/0105836 A1* | 4/2016 | Seok | H04W 36/32 370/331 |
| 2016/0113034 A1* | 4/2016 | Seok | H04W 74/04 370/329 |
| 2016/0119047 A1* | 4/2016 | Lee | H04B 7/0617 370/329 |
| 2016/0128005 A1* | 5/2016 | Chen | H04W 52/52 455/127.2 |
| 2016/0128024 A1* | 5/2016 | Frederiks | H04W 72/04 370/329 |
| 2016/0142187 A1* | 5/2016 | Yang | H04L 27/2602 370/328 |
| 2016/0143026 A1* | 5/2016 | Seok | H04W 72/0413 370/329 |
| 2016/0156438 A1* | 6/2016 | Sun | H04L 5/0007 370/330 |
| 2016/0285600 A1* | 9/2016 | Sun | H04L 5/0007 |

OTHER PUBLICATIONS

"International Application Serial No. PCT/US2015/059179, International Search Report dated Feb. 18, 2016", 3 pgs.
"International Application Serial No. PCT/US2015/059179, Written Opinion dated Feb. 18, 2016", 7 pgs.

* cited by examiner

| | 2.4 GHz / 5 GHz 214 | | |
|---|---|---|---|
| | 20 MHz 208 | 40 MHz 210 | 80 MHz 212 |
| FFT SIZE 202 | 256 | 512 | 1024 |
| DC+EDGE 204 | (3+11) | (3+11) | (5+23) |
| USABLE TONES 206 | 242 | 498 | 996 |

| | 20 MHz 316 | 40 MHz 318 | 80 MHz 320 |
|---|---|---|---|
| FFT SIZE 302 | 256 | 512 | 1024 |
| DC+EDGE 304 | (3+11) | (3+11) | (5+11) |
| USABLE TONES 306 | 242 | 498 | 996 |
| RU SIZES (DATA + PILOTS) 308 | 26, 52, 104, 242 | 26, 52, 104, 242, 498 | 26, 52, 104, 242, 498, 996 |
| MAXIMUM NUMBER OF ALLOCATIONS 310 | 9 | 10 | 11 |
| UNUSED TONES WITH MIX OF 26, 52, 104, AND 242 312 | 8 (96.7% EFFICIENT) | 22 (95.6% EFFICIENT) | 22 (97.8% EFFICIENT) |
| UNUSED TONES WITH 2X498 314 | --- | --- | 0 (100% EFFICIENT) |

FIG. 3

WIRELESS DEVICE, METHOD, AND COMPUTER READABLE MEDIA FOR ORTHOGONAL FREQUENCY DIVISION MULTIPLE ACCESS (OFDMA) ALLOCATIONS BASED ON A BASIC TONE RESOURCE UNIT OR ENTIRE SUB-CHANNEL

PRIORITY CLAIM

This application claims the benefit of priority under 35 USC 119(e) to U.S. Provisional Patent Application Ser. No. 62/087,173, filed Dec. 3, 2014, and U.S. Provisional Patent Application Ser. No. 62/109,464, filed Jan. 29, 2015, both of which is incorporated herein by reference in its entirety.

TECHNICAL FIELD

Embodiments pertain to wireless communications in a wireless local-area network (WLAN). Some embodiments relate to an Orthogonal Frequency-Division Multiple Access (OFDMA) tone allocation design. Some embodiments relate to resource allocations of bandwidths. Some embodiments relate to resource allocations for uplink or downlink transmission opportunities. Some embodiments relate to the Institute of Electrical and Electronic Engineers (IEEE) 802.11ax standard.

BACKGROUND

One issue in wireless local-area networks (WLANs) is efficiently using the wireless network. Often there may be many devices sharing the wireless medium and it may be difficult to determine how to share the wireless medium. Moreover, in OFDMA use the wireless medium may be used by more than one wireless device simultaneously. Additionally, the wireless network may support different protocols, including legacy protocols.

Thus, there are general needs for systems and methods for efficiently using the wireless medium, and in particular, for determining how to allocate the wireless medium for OFDMA use.

BRIEF DESCRIPTION OF THE DRAWINGS

The present disclosure is illustrated by way of example and not limitation in the figures of the accompanying drawings, in which like references indicate similar elements and in which:

FIG. 2 illustrates a table that illustrates a tone allocation for 2.4 GHz and 5 GHz in accordance with some embodiments;

FIG. 3 illustrates a table which summarizes resource unit (RU) sizes, maximum number of allocations, unused tones, and unused tones with 2×498 for each bandwidth of operation, in accordance with some embodiments;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
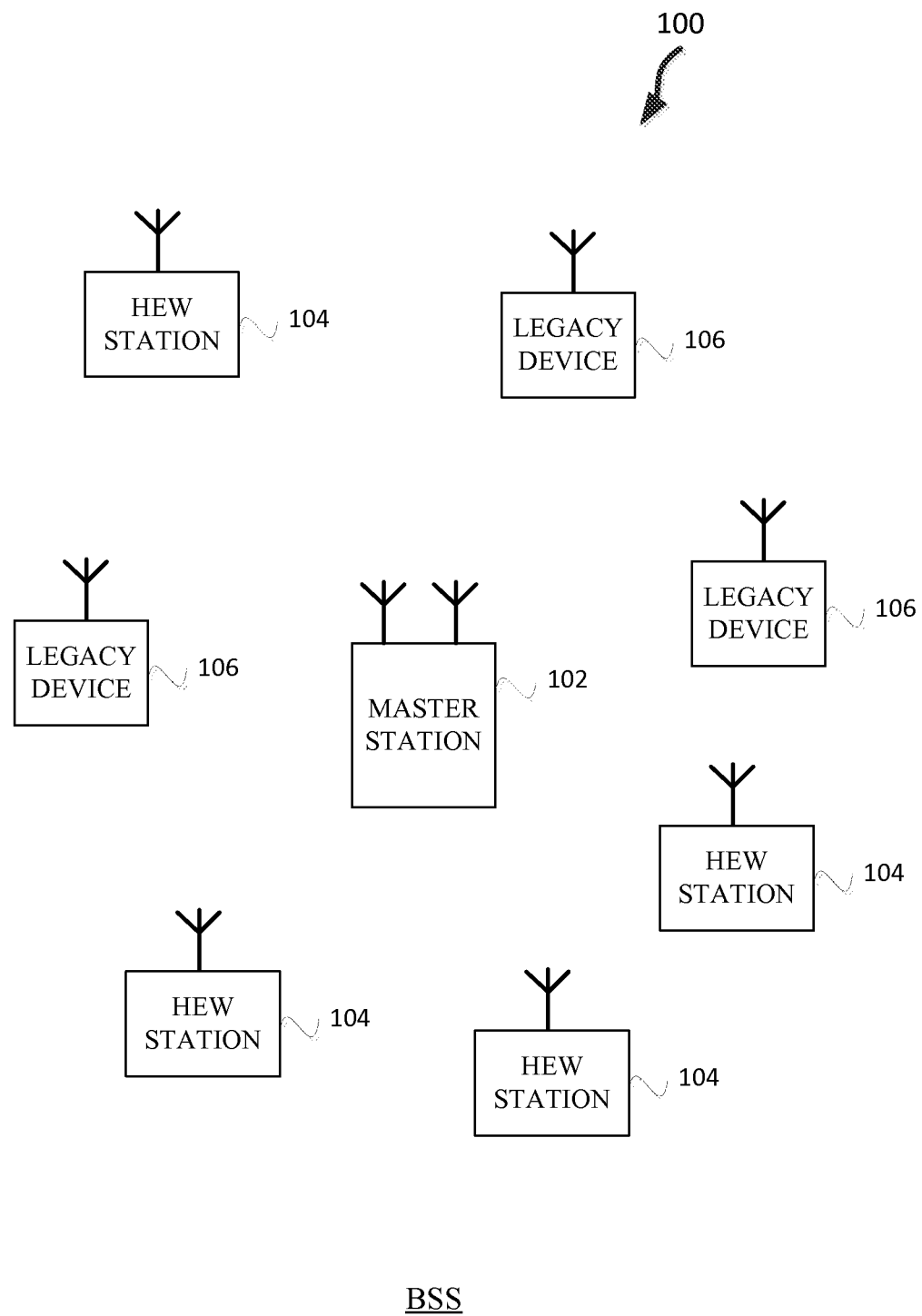
FIG. 1 illustrates a wireless local-area network (WLAN) in accordance with some embodiments.

FIG. 1 illustrates a wireless local-area network (WLAN) in accordance with some embodiments. The WLAN may comprise a basis service set (BSS) 100 that may include a master station 102, which may be an access point (AP); a plurality of high-efficiency WLAN (HEW) (e.g., IEEE 802.11ax) stations 104; and a plurality of legacy (e.g., IEEE 802.11n/ac) devices 106.

The master station 102 may be an AP using the 802.11 communication protocol to transmit and receive. The master station 102 may be a base station. The master station 102 may use other communications protocols as well as the 802.11 protocol. The 802.11 protocol may be 802.11ax. The 802.11 protocol may include using Orthogonal Frequency-Division Multiple Access (OFDMA), time division multiple access (TDMA), and/or code division multiple access (CDMA). The 802.11 protocol may include a multiple access technique. For example, the 802.11 protocol may include space-division multiple access (SDMA) and/or multi-user (MU) multiple-input and multiple-output (MIMO)(MU-MIMO).

The HEW stations 104 may operate in accordance with 802.11ax or another standard of 802.11. The legacy devices 106 may operate in accordance with one or more of the 802.11 a/g/n/ac standards, or another legacy wireless communication standard. In example embodiments, the HEW stations 104 may be termed high efficiency (HE) stations. The legacy devices 106 may be stations.

The HEW stations 104 may be wireless transmit and receive devices such as cellular telephones, handheld wireless devices, wireless glasses, wireless watches, wireless personal devices, tablets, or other devices that may be transmitting and receiving using the 802.11 protocol, such as 802.11ax, or another wireless protocol.

The BSS 100 may operate on a primary channel and one or more secondary channels or sub-channels. The BSS 100 may include one or more master stations 102. In accordance with embodiments, the master station 102 may communicate with one or more of the HEW stations 104 on one or more of the secondary channels or sub-channels, or on the primary channel. In example embodiments, the master station 102 communicates with the legacy devices 106 on the primary channel. In other example embodiments, the master station 102 communicates with the legacy devices 106 on secondary channels or sub-channels. In example embodiments, the master station 102 may be configured to communicate concurrently with one or more of the HEW stations 104 on one or more of the secondary channels and a legacy device 106 utilizing only the primary channel and not utilizing any of the secondary channels. In example embodiments, the master station 102 may communicate concurrently with one or more of the HEW stations 104 on one or more of the secondary channels and a legacy device 106 on a primary channel or a secondary channel.

The master station 102 may communicate with the legacy devices 106 in accordance with legacy IEEE 802.11 communication techniques. In example embodiments, the master station 102 may also be configured to communicate with the HEW stations 104 in accordance with legacy IEEE 802.11 communication techniques. Legacy IEEE 802.11 communication techniques may refer to any IEEE 802.11 communication technique prior to IEEE 802.11ax.

In some embodiments, a HEW frame may be configurable to have the same bandwidth and the bandwidth may be one of a 20 MHz, 40 MHz, 80 MHz, 160 MHz, or 320 MHz contiguous bandwidth or an 80+80 MHz (160 MHz) non-contiguous bandwidth. In some embodiments, 78.125 KHz may be used for the subcarrier spacing, which may provide 256 subcarriers or tones for a 20 MHz bandwidth. In some embodiments, bandwidths of 20 MHz (256 tones), 2.03125 MHz (26 tones), 4.0625 MHz (52 tones), 8.125 MHz (104 tones), and 18.90625 (242 tones), or a combination thereof, may also be used. In some embodiments, the bandwidths may vary depending on how many tones are used. In some embodiments, different bandwidths are used that may be smaller than 320 MHz. For example, only 102 data tones out of 104 tones may be used, and some of the leftover tones may be used for pilots; for example, 4, 5, or 6 tones may be used for pilots. Then, in example embodiments, the exact bandwidth would be 102 data+4 pilots=106×78.125 KHz=8.28125 MHz; 102 data+5 pilots=107×78.125 KHz=8.359375 MHz; and 102 data+6 pilots=108×78.125 KHz=8.4375 MHz. A HEW frame may be configured for transmitting a number of spatial streams.

In other embodiments, the master station 102, HEW stations 104, and/or legacy devices 106 may also implement different technologies, such as CDMA2000, CDMA2000 1×, CDMA2000 EV-DO, Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (Wi-MAX)), BlueTooth®, or other technologies.

In example embodiments, if the master station 102 transmits a beacon only on a primary channel, then the HEW stations 104 and legacy devices 106 need to receive the beacon on the primary channel every multiple of a beacon interval (e.g., every beacon interval, every 10th beacon interval, etc.) to maintain their synchronization with the system (e.g., master station 102).

In example embodiments, the HEW stations 104 and/or the master station 102 are configured to perform the functions described in conjunction with FIGS. 1-8, such as generating a resource allocation for a bandwidth, transmitting the resource allocation to the HEW stations 104, receiving the resource allocation, and operating in accordance with the resource allocation.

Some embodiments relate to high-efficiency wireless communications, including high-efficiency WLAN (HEW) communications. In accordance with some IEEE 802.11ax (HEW) embodiments, the master station 102 may operate as a master station which may be arranged to contend for a wireless medium (e.g., during a contention period) to receive exclusive control of the medium for a HEW control period (i.e., a transmission opportunity (TXOP)). The master station 102 may transmit a trigger frame at the beginning of the HEW control period. The master station 102 may transmit a time duration of the TXOP. During the HEW control period, the HEW stations 104 may communicate with the master station 102 in accordance with a non-contention based multiple access technique. This is unlike conventional WLAN communications in which devices communicate in accordance with a contention-based communication technique, rather than a multiple access technique. During the HEW control period, the master station 102 may communicate with the HEW stations 104 using one or more HEW frames. During the HEW control period, the legacy devices 106 may refrain from communicating. In some embodiments, the trigger frame may be referred to as a HEW control and schedule transmission.

In some embodiments, the multiple access technique used during the HEW control period may be a scheduled OFDMA technique, although this is not a requirement. In some embodiments, the multiple access technique may be MU-MIMO. In some embodiments, the multiple access technique may be combination of OFDMA and MU-MIMO techniques. In some embodiments, the multiple access technique may be a TDMA technique or an FDMA technique. In some embodiments, the multiple access technique may be an SDMA technique.

The master station 102 may also communicate with the legacy devices 106 in accordance with legacy IEEE 802.11 communication techniques. In some embodiments, the master station 102 may also be configurable to communicate with the HEW stations 104 outside the HEW control period in accordance with legacy IEEE 802.11 communication techniques, although this is not a requirement.

FIG. 2 illustrates a table 200 that illustrates a tone allocation for 2.4 GHz and 5 GHz in accordance with some embodiments. Illustrated in FIG. 2 are a fast Fourier transform (FFT) size 202, DC and edge tones (DC+EDGE) 204, and usable tones 206, for sub-channels of 20 MHz 208, 40 MHz 210, and 80 MHz 212. The tone allocation may be the same for both 2.4 GHz and 5 GHz 214. In some embodiments, the number of tones allocated for DC+EDGE 204 may be a different number of tones.

FIG. 3 illustrates a table 300 which summarizes resource unit (RU) sizes 308, maximum number of allocations 310, unused tones 312, and unused tones with 2×498 314, for each bandwidth 322 of operation including 20 MHz 316, 40 MHz 318, and 80 MHz 320, in accordance with some embodiments. Also illustrated in FIG. 3 are FFT size 302, DC+EDGE 304, and usable tones 306, for each bandwidth 322.

The RU sizes 308 indicate the RU sizes 308 that may be allocated for the bandwidth 322. For 20 MHz 316, the RU sizes 308 are 26, 52, 104, and 242 tones. For 40 MHz 318, the RU sizes 308 are 26, 52, 104, 242, and 498 tones. For 80 MHz 320, the RU sizes 308 are 26, 52, 104, 242, 498, and 996 tones. The maximum number of allocations 310 indicates the maximum number of HEW stations 104 that may be allocated an RU for the bandwidth 322. The following indicates how the maximum number of HEW stations 104 may be realized for the different bandwidths 322. For 20 MHz 316, 9 HEW stations 104 may be allocated 26 tones each. For 40 MHz 318, 9 HEW stations 104 may be allocated 26 tones each and one HEW station 104 may be allocated 242 tones. For 80 MHz 320, 9 HEW stations 104 may be allocated 26 tones each, 1 HEW station 104 may be allocated 242 tones, and 1 HEW station 104 may be allocated 498 tones.

The unused tones 312 indicate the number of unused tones when 26, 52, 104, and 242 RU sizes are used. The unused tones 314 2×498 indicate the number of unused tones when two 498 RUs are used.

Figure 4:
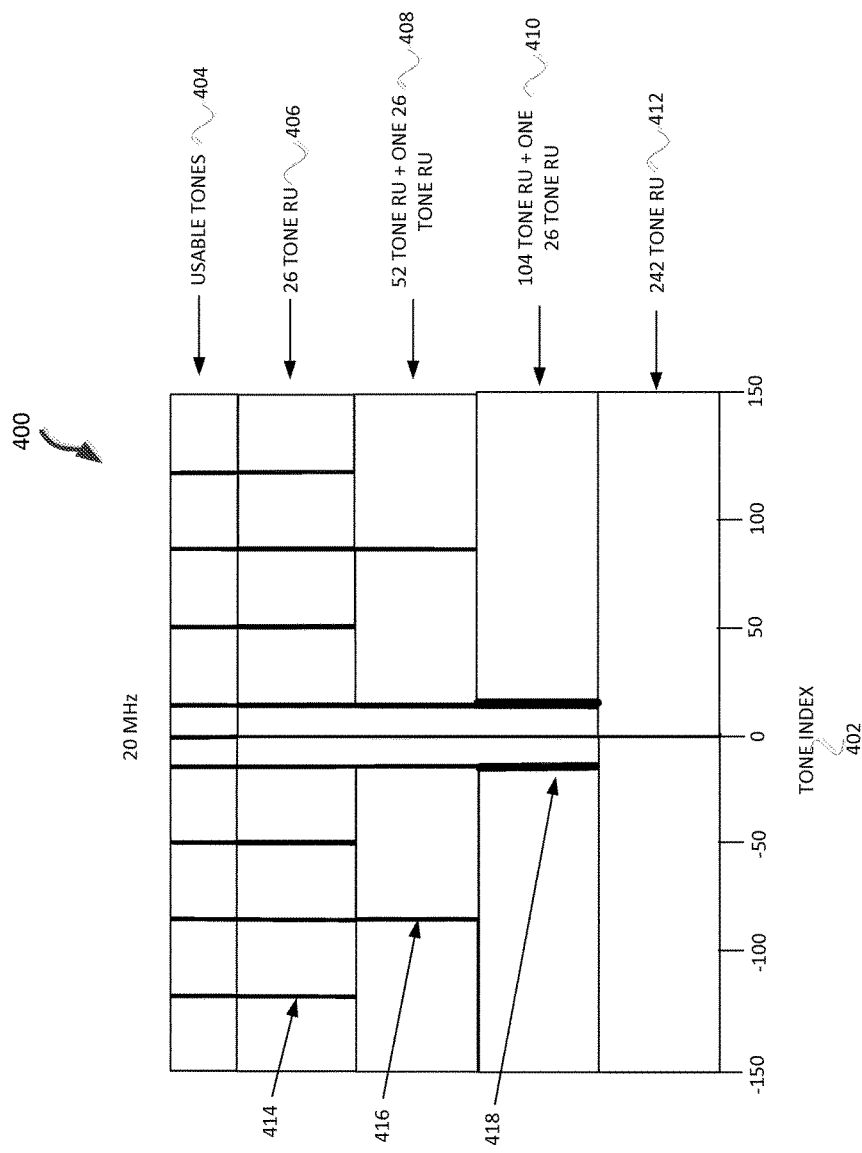
FIG. 4 illustrates a structure for RUs for a 20 MHz channel in accordance with some embodiments.

FIG. 4 illustrates a structure for RUs for a 20 MHz channel 400 in accordance with some embodiments. A tone index 402 is illustrated along the horizontal axis, and usable tones 404 and different RU structures are illustrated along the vertical axis.

The usable tones 404 illustrate the tones that are available for RUs. 26 tone RUs 406 is a tone structure where there are nine 26 tone RUs. There are four 26 tone RUs on either side of the 0 tone index 402 and one 26 tone RU that straddles the 0 tone index 402. The black lines 414 illustrate eight interlaced null subcarriers between the eight 26 tone RUs. 52 tone RU and one 26 tone RU 408 is another tone structure where there are 4 52 tone RUs and one 26 tone RU. The black lines 416 indicate two nulls between 52 tone RUs. 104 tone RU and one 26 tone RU 410 is another tone structure where there are two 104 tone RUs and one 26 tone RU. The black lines 418 may be four nulls between the 104 tone RU and the center 26 tone RU. 242 tone RU 412 is another tone structure where there is one 242 tone RU with nulls in the center at the 0 tone index 402. One skilled in the art would recognize that a different number of nulls may be used.

In example embodiments, a resource allocation may include one to nine RUs from the 20 MHz channel. A resource allocation may include nine RUs with all nine being 26 tone RUs 406. A resource allocation may include seven RUs with five 26 tone RUs 406 and two 52 tone RUs. A resource allocation may include six RUs with five 26 tone RUs and one 104 tone RU. A resource allocation may include one 242 tone RU 412. In example embodiments, the nulls may be distributed differently and there may be fewer or more nulls.

Figure 5A:
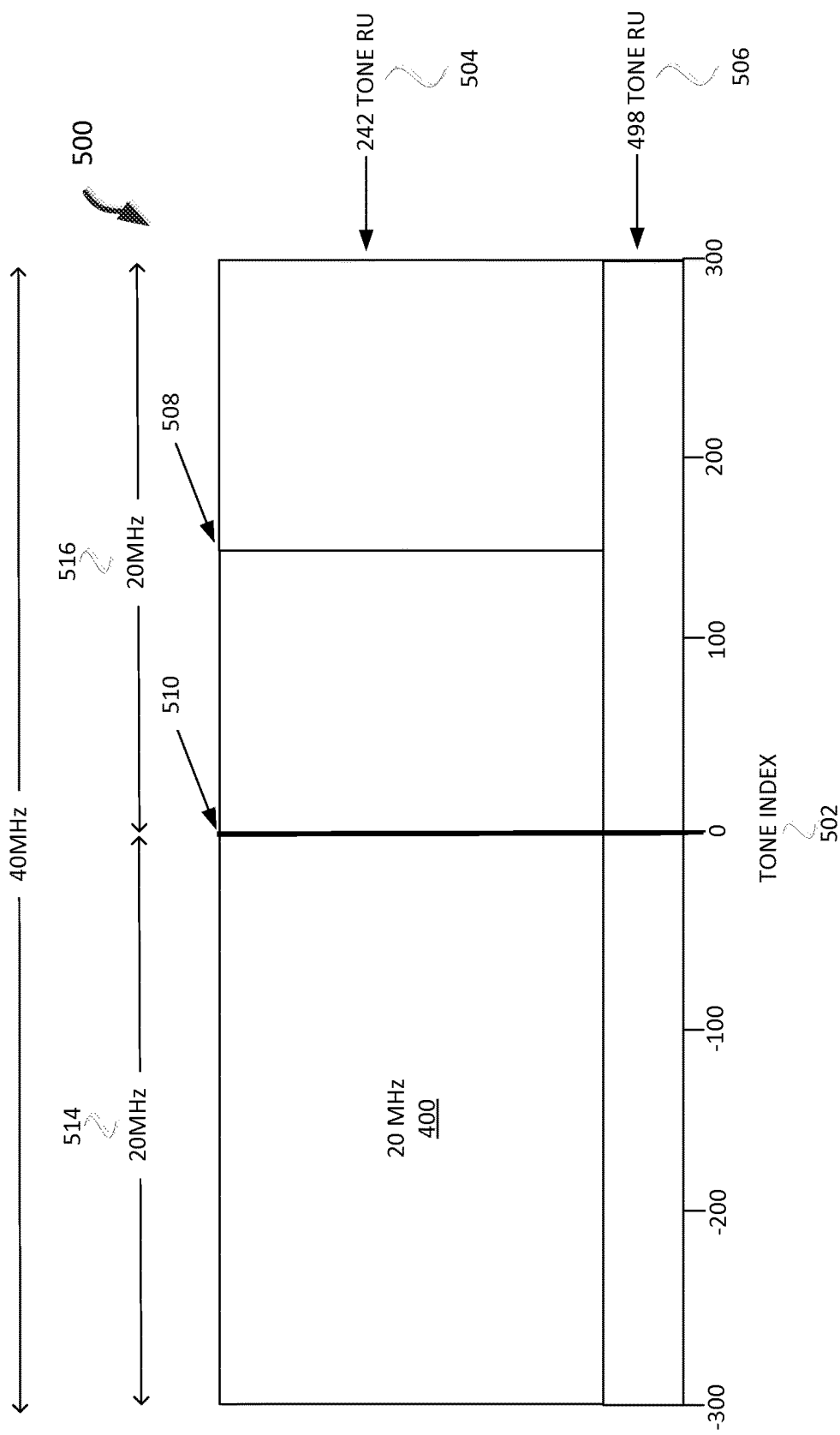
FIGS. 5A and 5B illustrate a structure for RUs for a 40 MHz channel in accordance with some embodiments.
Figure 5B:
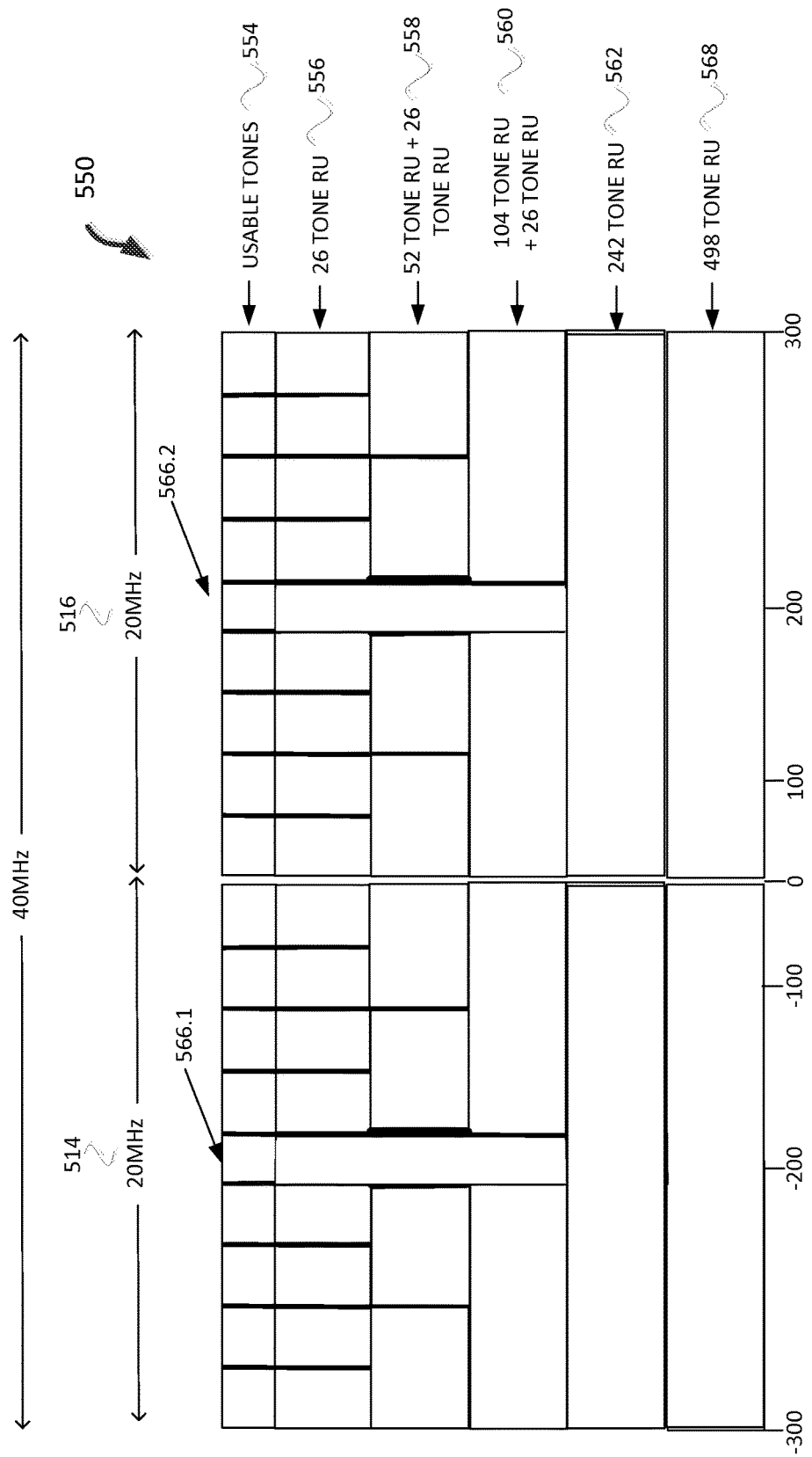

FIGS. 5A and 5B illustrate structures for RUs for a 40 MHz channel 500, 550 in accordance with some embodiments. A tone index 502 is illustrated along the horizontal axis, and different RU structures are illustrated along the vertical axis. Illustrated in FIG. 5A is a structure for RUs for a 40 MHz channel 500 that may include two 20 MHz channels 514, 516. In example embodiments, one of the 20 MHz channels 514, 516 may have one of the structures of RUs for a 20 MHz channel 400 described with reference to FIG. 4, and the other 20 MHz channel 514, 516 may have one 242 tone RU 504. The structure for RUs for the 40 MHz channel 500 may include one 498 tone RU 506 with nulls 510 in the center. In example embodiments, both 20 MHz channels 514, 516 may have the structure of RUs for a 20 MHz channel 400 described with reference to FIG. 4.

In example embodiments, the maximum RUs for a 40 MHz channel is ten, which includes the maximum of nine RUs for a 20 MHz channel described with reference to FIG. 4 and one 242 tone RU 504, which may include nulls 508 in the middle. There may be nulls 510 between the structure of RUs for a 20 MHz channel 400 and the 242 tone RUs 504.

Illustrated in FIG. 5B is a structure for RUs for a 40 MHz channel 550. Usable tones 554 illustrate the tones that are available for RUs. 26 tone RUs 556 is a tone structure where there are eighteen 26 tone RUs. There may be four 26 tone RUs on either side of a 26 tone RU in the middle 564 for each of two 20 MHz channels 514, 516. Interlaced null subcarriers and/or pilot tones may be part of or between the eighteen 26 tone RUs 556. 52 tone RUs and 26 tone RUs 558 is a tone structure with two 52 tone RUs on either side of a 26 tone RU 564 for each of two 20 MHz channels 514, 516. Interlaced null subcarriers and/or pilot tones may be part of or between the eight 52 tone RUs and two 26 tone RUs 564. 104 tone RUs and 26 tone RUs 560 is a tone structure with two 104 tone RUs on either side of a 26 tone RU 564 for each of two 20 MHz channels 514, 516. Interlaced null subcarriers and/or pilot tones may be part of or between the four 104 tone RUs and the two 26 tone RUs 564. 242 tone RU 562 is a tone structure with two 242 tone RUs. Interlaced null subcarriers and/or pilot tones may be part of or between the two 242 tone RUs 562. 498 tone RU 568 is a tone structure with one 498 tone RU 568. Interlaced null subcarriers and/or pilot tones may be part of the 498 tone RU 564.

Figure 6A:
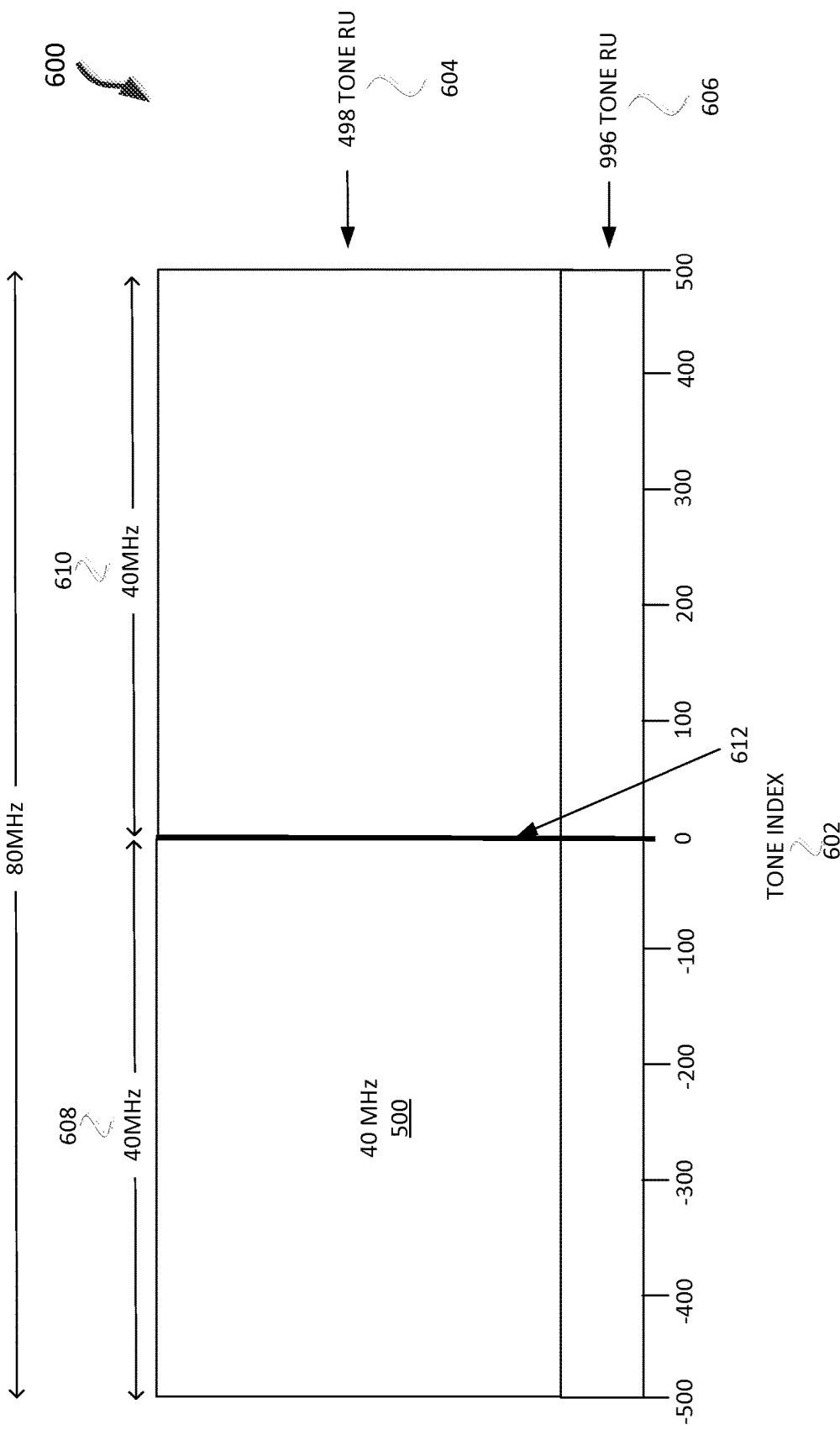
FIGS. 6A and 6B illustrate a structure for RUs for an 80 MHz channel in accordance with some embodiments.
Figure 6B:
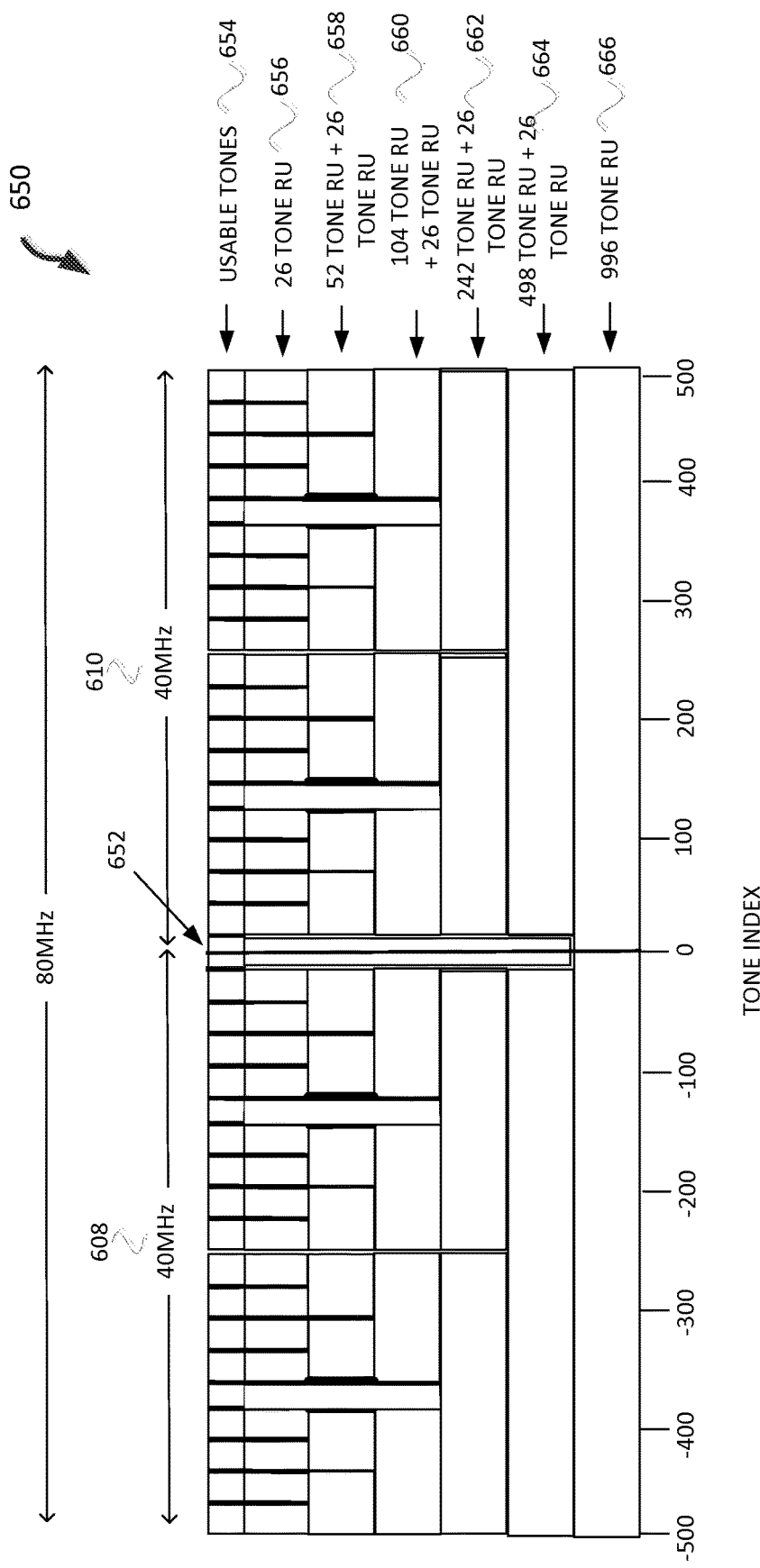

FIGS. 6A and 6B illustrate structures for RUs for an 80 MHz channel 600, 650 in accordance with some embodiments. A tone index 602 is illustrated along the horizontal axis, and different RU structures are illustrated along the vertical axis. Illustrated in FIG. 6A is a structure for RUs for an 80 MHz channel 600 that may include two 40 MHz channels 608, 610. In example embodiments, one of the 40 MHz channels 608, 610 may have one of the structures of RUs for a 40 MHz channel 500, 550 described with respect to FIGS. 5A and 5B, and the other 40 MHz channel 608, 610 may have one 498 tone RU 604. In example embodiments, both of the 40 MHz channels 608, 610 may have structures of RUs for a 40 MHz channel 500, 550 described in FIGS. 5A and 5B. The structure for RUs for the 80 MHz channel 600 may include one 996 tone RU 606 with nulls 612 in the center.

In example embodiments, the maximum RUs for an 80 MHz channel is eleven, which includes the maximum of 9 RUs for a 20 MHz channel described with reference to FIG. 4, one 242 tone RU 504 described with reference to FIG. 5A, and one 498 tone RU 604. There may be nulls 612 between the structure of RUs for a 40 MHz channel 500 and the 498 tone RUs 604.

The structure for RUs for an 80 MHz channel 600 may be easily scaled for use with 160 MHz or 80+80 MHz channel widths, where the next 80 MHz would be either the complete 80 MHz channel or the entire 160 MHz channel.

Illustrated in FIG. 6B is a structure for RUs for an 80 MHz channel 650. Usable tones 654 illustrate the tones that are available for RUs. 26 tone RUs 656 is a tone structure with 37 26 tone RUs. Interlaced null subcarriers and/or pilot tones may be part of or between the 37 26 tone RUs 654. One 26 tone RU 652 may be in the middle between two 40 MHz channels 664.

52 tone RUs and 26 tone RUs 658 is a tone structure with sixteen 52 tone RUs and five 26 tone RUs with one 26 tone RU 652 in the middle. Interlaced null subcarriers and/or pilot tones may be part of or between the sixteen 52 tone RUs and five 26 tone RUs 658.

104 tone RUs and 26 tone RUs 660 is a tone structure with eight 104 tone RUs and five 26 tone RUs with one 26 tone RU 652 in the middle. Interlaced null subcarriers and/or pilot tones may be part of or between the eight 104 tone RUs and five 26 tone RUs 660.

242 tone RUs and 26 tone RU 662 is a tone structure with four 242 tone RUs and one 26 tone RU 652. Interlaced null subcarriers and/or pilot tones may be part of or between the four 242 tone RUs 662 and the 26 tone RU 652. 498 tone RU and 26 tone RU 664 is a tone structure with two 498 tone RUs and one 26 tone RU 652. Interlaced null subcarriers and/or pilot tones may be part of the two 498 tone RUs and one 26 tone RU 652. 996 tone RU 666 is a tone structure with one 996 tone RU. Interlaced null subcarriers and/or pilot tones may be part of the 996 tone RU 666. Those skilled in the art will recognize that the number of tones may vary according to how many tones are used for null subcarriers and pilot tones.

Figure 7:
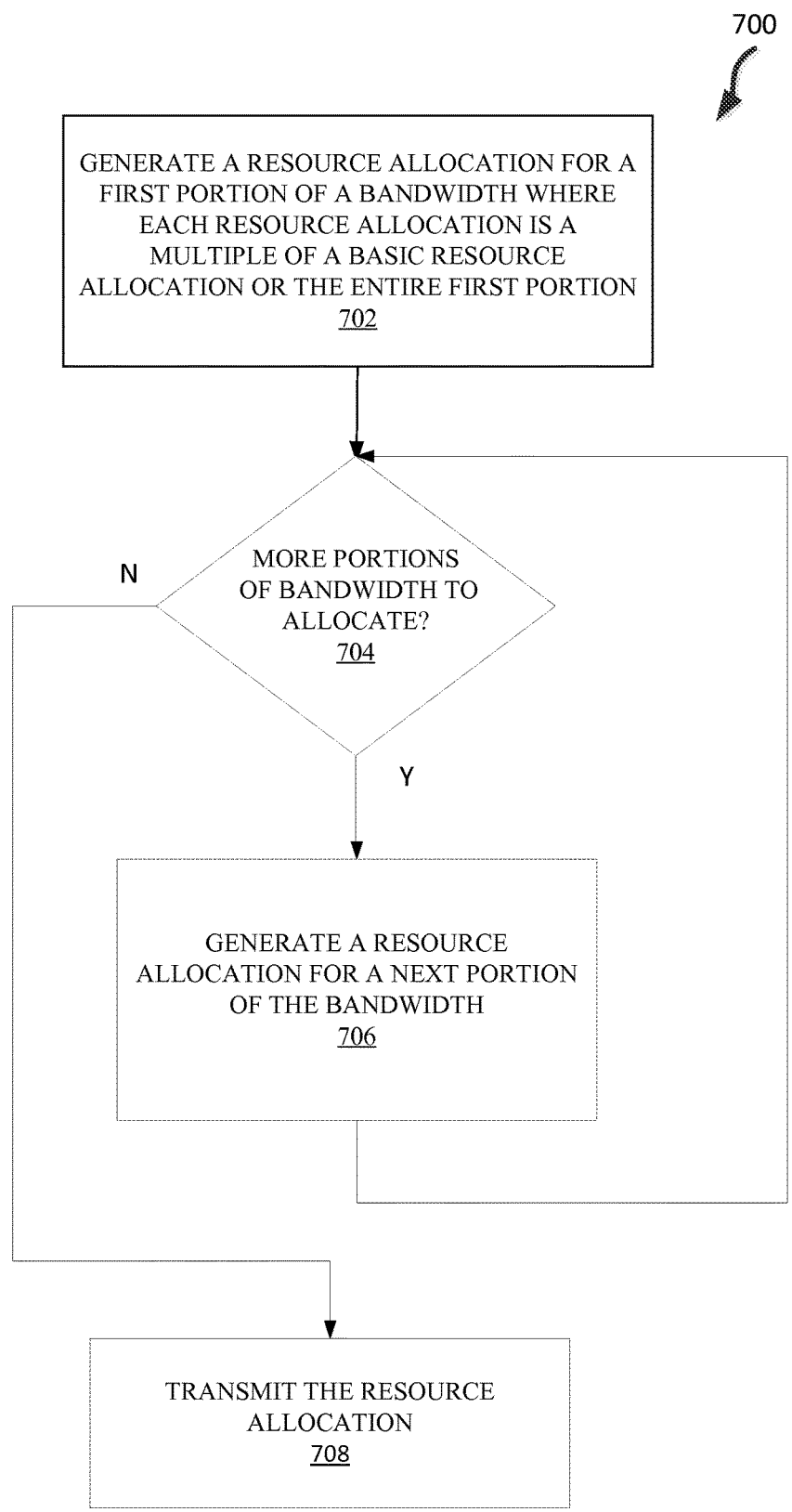
FIG. 7 illustrates a method for resource allocation of a bandwidth in accordance with some embodiments.

FIG. 7 illustrates a method 700 for resource allocation of a bandwidth in accordance with some embodiments. The method 700 begins at operation 702 with generating a resource allocation for a first portion of a bandwidth where each resource allocation is a multiple of a basic resource allocation or the entire first portion. For example, a master station 102 may determine a resource allocation for an OFDMA tone allocation for multi-user operation in 802.11ax, which may be an uplink or downlink multi-user transmission opportunity.

The waveform may operate with a four times (4×) longer symbol duration than existing IEEE 802.11 OFDMA waveforms (VHT, HT or non-HT) defined in the existing IEEE 802.11 standards such as legacy standards IEEE 802.11 a/g/n/ac. For example, the waveform may be between 13.2 microseconds (μs) and 16 μs.

The legacy symbol duration may be either of the following: for short cyclic prefix (CP): 3.2 μs+0.4 μs=3.6 μs; for regular CP: 3. μs+0. μs=4 μs. The four times the legacy symbol duration may be one of the following: for short CP: (3.2)×4+0.4=13.2 μs; and, for long CP: (3.2)×4+(0.8×4)=16 μs.

The 1024-point fast Fourier transform (FFT) may be used with 4× symbol duration of 11n/ac, and may be used in both outdoor and indoor environments. In example embodiments, in an outdoor environment, four times longer symbol duration enables the use of a more efficient CP to overcome the longer delay spread, and in an indoor environment, it allows a more relaxed requirement for clock timing accuracy.

The basic resource allocation may be 26 tones. The resource allocation may be one of the resource allocations of the structure for RUs for a 20 MHz channel 400 (FIG. 4). For example, the resource allocation may be nine 26 tones resource allocations, four 52 tone allocations, etc. The resource allocation may be the entire bandwidth of 242 tones as well. The OFDMA allocations may have fixed locations as indicated in FIGS. 4, 5A, 5B, 6A, and 6B.

The method 700 may continue at operation 704 with determining whether there are more portions of bandwidth to allocate. If there are more portions of bandwidth to allocate, the method 700 continues at operation 706 with generating a resource allocation for a next portion of the bandwidth. In example embodiments, the bandwidth of the next portion is at least as large as the bandwidth of all the preceding allocations combined. For example, the bandwidth to allocate may be 20 MHz, 40 MHz, 80 MHz, 160 MHz, or another value of a bandwidth. The bandwidth may be 80 MHz, in which case the next portion may be for the next 20 MHz channel 516 (FIG. 5A), which may be 242 tone RUs 504, or the entire 40 MHz channel may be allocated to a 498 tone RU 506. The allocation of the next 20 MHz channel 516 is at least as large as any allocation in the first 20 MHz channel 514 because the 242 tone RU 504 is the smallest in the next 20 MHz channel 516, and the largest allocation in the first 20 MHz channel 514 is 242 tones.

In example embodiments, the allocation of the next portion is a multiple of a basic resource allocation or the entire bandwidth of the next portion. For example, the basic resource allocations may be 26 tones, 52 tones, 104 tones, or 242 tones for the bandwidth equal to 20 MHz; 26 tones, 52 tones, 104 tones, 242 tones, or 498 tones for the bandwidth equal to 40 MHz; and 26 tones, 52 tones, 104 tones, 242 tones, 498 tones, or 996 tones for the bandwidth equal to 80 MHz.

The method 700 may return to operation 704 with determining whether there are more portions of bandwidth to allocate. There may be another 40 MHz channel 610 to allocate, as illustrated in FIG. 6A. The method 700 may continue at operation 706 with generating a resource allocation for a next portion of the bandwidth. In example embodiments, the next portion of the bandwidth is at least as large as the bandwidth of all the preceding allocations combined. The resource allocations available for the second 40 MHz channel 610 are 498 tone RUs 604 or one 996 tone RU 606 for the whole 80 MHz channel, which are both at least as large as any resource allocation for the first 40 MHz channel 608. In example embodiments, the allocation of the next portion is a multiple of a basic resource allocation or the entire bandwidth of the next portion.

The method 700 may return to operation 704 with determining whether there are more portions of bandwidth to allocate. There may not be more portions of the bandwidth to allocate, in which case the method 700 continues at operation 708 with transmitting the resource allocation. For example, a master station 102 may transmit the resource allocations to one or more HEW stations 104. In example embodiments, the master station 102 may determine the size of the resource allocations based on a number of HEW stations 104 that are associated with the master station 102. In example embodiments, there may have been more portions of the bandwidth to allocate. For example, the bandwidth may be 160 MHz or 320 MHz.

Example embodiments provide a limited number of multiplexed users in each bandwidth. For example, in FIG. 4, a 20 MHz BSS provides up to 9 users; in FIGS. 5A and 5B, a 40 MHz BSS provides up to 10 users; in FIGS. 6A and 6B, an 80 MHz BSS provides up to 11 users. In example embodiments, a 160 MHz BSS (not illustrated) may provide up to 12 users and a 320 MHz BSS (not illustrated) may provide up to 13 users.

Figure 8:
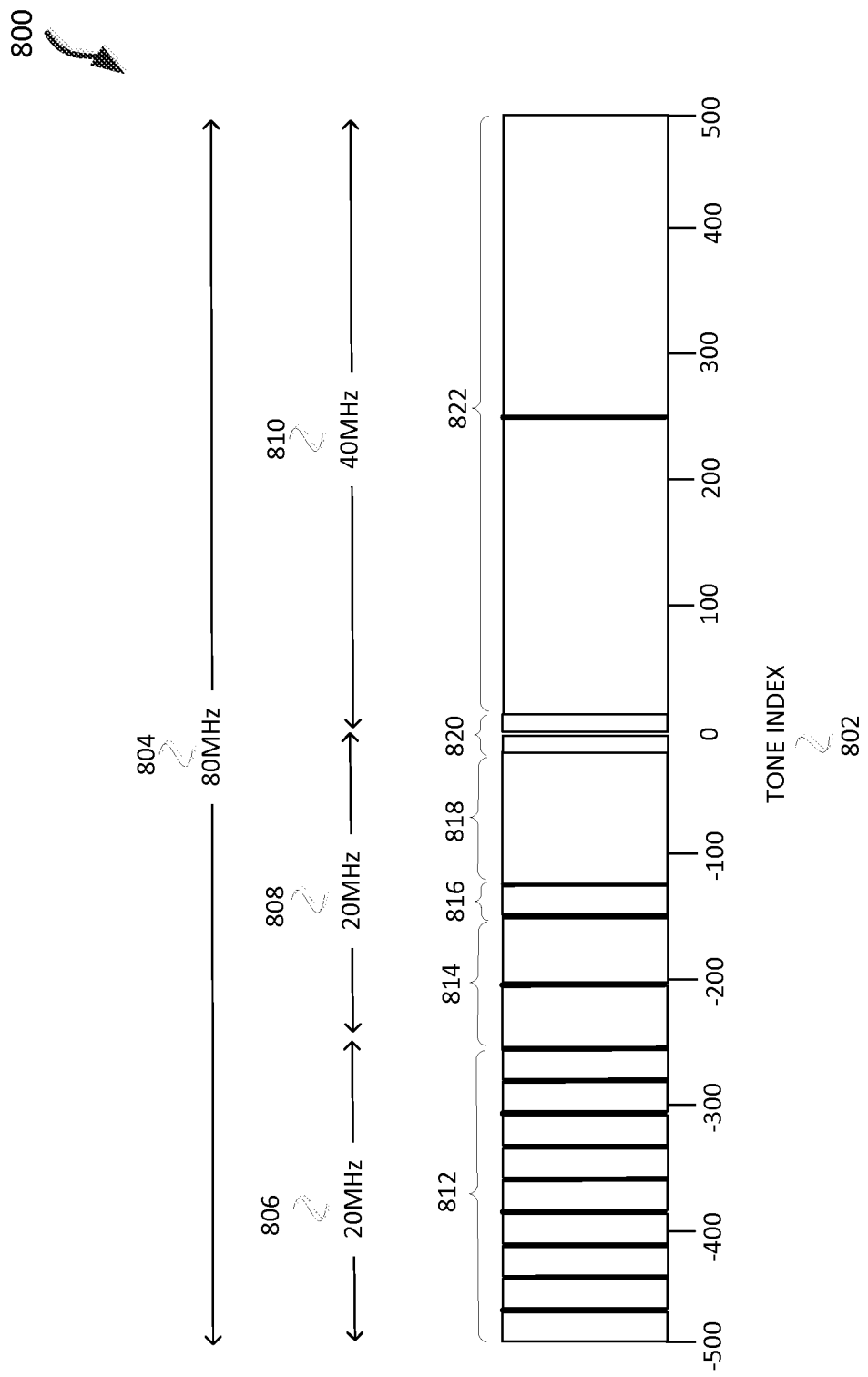
FIG. 8 illustrates an example resource allocation of an 80 MHz bandwidth in accordance with some embodiments.

FIG. 8 illustrates an example resource allocation 800 of an 80 MHz bandwidth 804 in accordance with some embodiments. Illustrated in FIG. 8 are the 80 MHz bandwidth 804, a 20 MHz channel 806, a 20 MHz channel 808, a 40 MHz channel 810, a tone index 802, and RU allocations 812, 814, 816, 818, 820, 822.

The RU allocation 812 may include 9 26 tone resource allocations as illustrated in the 26 tone RU 406 (FIG. 4). The RU allocation 814 may include two 52 tone resource allocations as illustrated in the 52 tone RU 408. The RU allocation 816 may be a 26 tone allocation such as the central 26 tone RU illustrated in FIG. 4. The RU allocation 818 may be a 104 tone allocation such as that illustrated in the 104 tone RU 410. The RU allocation 820 may be a 26 tone allocation. The RU allocation 822 may be two 242 tone allocations such as the 242 tone RU 504 (FIG. 5A).

Figure 9:
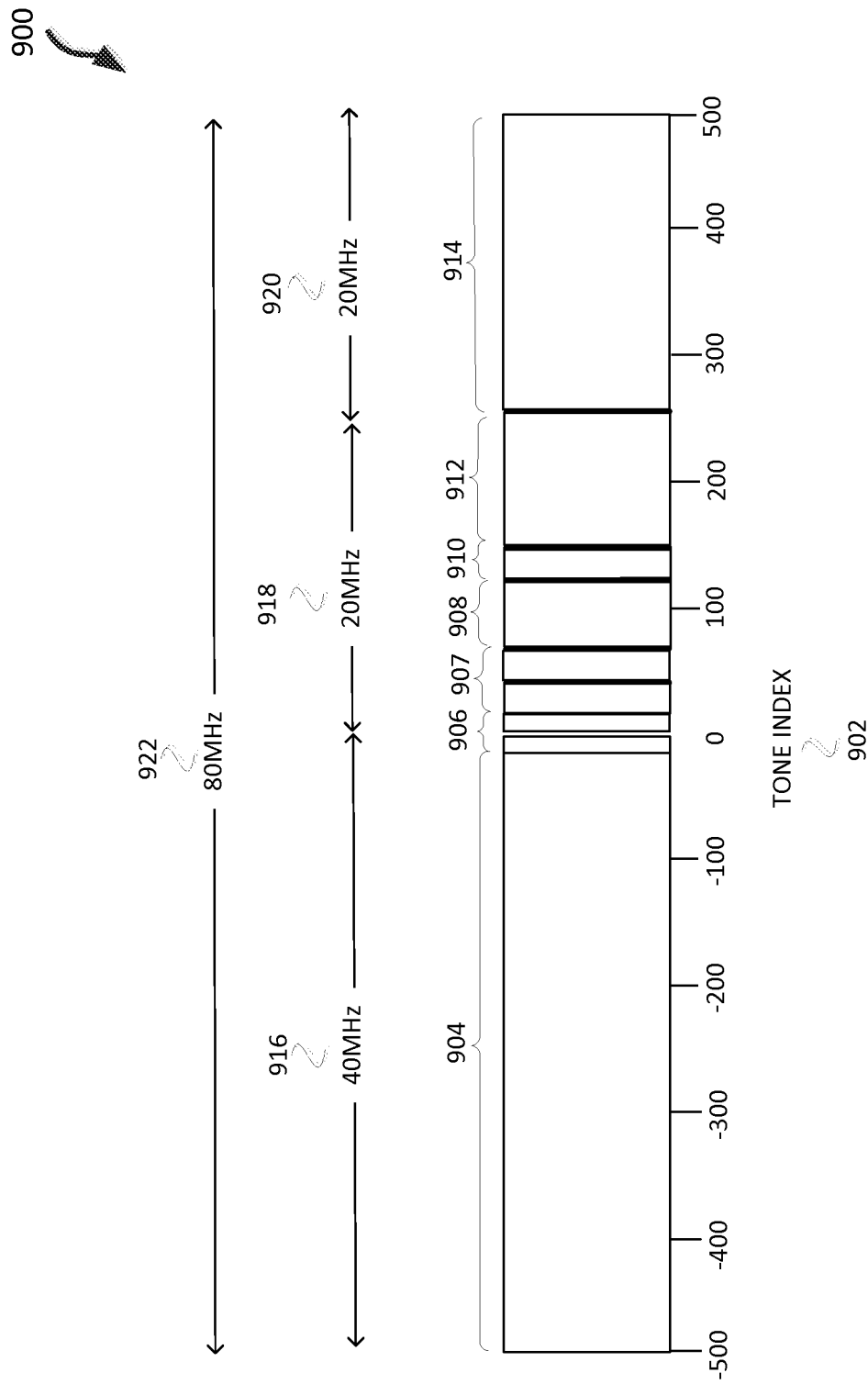
FIG. 9 illustrates an example resource allocation of an 80 MHz bandwidth in accordance with some embodiments.

FIG. 9 illustrates an example resource allocation 900 of an 80 MHz bandwidth 922 in accordance with some embodiments. Illustrated in FIG. 9 are the 80 MHz bandwidth 922, a 40 MHz channel 916, a 20 MHz channel 918, a 20 MHz channel 920, a tone index 902, and RU allocations 904, 906, 907, 908, 910, 912, and 914.

The RU allocation 904 is a 40 MHz wide RU such as those illustrated with respect to the 40 MHz channel 608 (FIG. 6A). The RU allocation 906 may be a 26 tone RU. The RU allocation 907 includes two 26 tone RUs such as the 26 tone RU 406 (FIG. 4). The RU allocation 908 is a 52 tone RU such as the 52 tone RU 408. The RU allocation 910 is a 26 tone allocation such as the 26 tone RU that straddles 0 in FIG. 4. The RU allocation 912 is a 104 tone RU such as the 104 tone RU 410. The RU allocation 914 is a 242 tone allocation such as the 242 tone RU 412.

The 20 MHz channel 918 bandwidth may then be divided as follows: two 26 tone RUs from the 26 tone RU 406, one 52 tone RU and one 26 tone RU 408, and one 104 tone RU 410.

Figure 10:
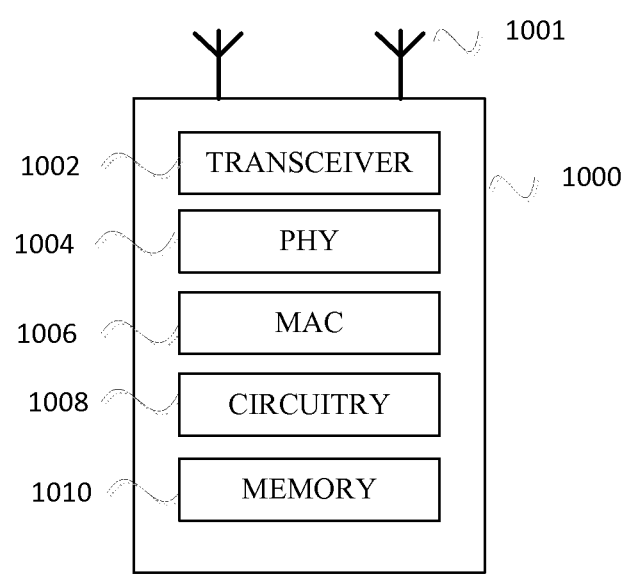
FIG. 10 illustrates a HEW device in accordance with some embodiments.

FIG. 10 illustrates a HEW device 1000 in accordance with some embodiments. The HEW device 1000 may be a HEW compliant device that may be arranged to communicate with one or more other HEW devices, such as HEW stations 104 (FIG. 1) or master station 102 (FIG. 1), as well as to communicate with legacy devices 106 (FIG. 1). The HEW stations 104 and legacy devices 106 may also be referred to as HEW stations (STAs) and legacy STAs, respectively. The HEW device 1000 may be suitable for operating as the master station 102 (FIG. 1) or a HEW station 104 (FIG. 1). In accordance with embodiments, the HEW device 1000 may include, among other things, a transmit/receive element such as an antenna 1001, a transceiver 1002, physical layer circuitry (PHY) 1004, and medium-access control layer circuitry (MAC) 1006. The PHY 1004 and MAC 1006 may be HEW compliant layers and may also be compliant with one or more legacy IEEE 802.11 standards. The MAC 1006 may be arranged to configure physical protocol data units (PPDUs) and to transmit and receive PPDUs, among other things. The HEW device 1000 may also include other circuitry 1008 and memory 1010 configured to perform the various operations described herein. The circuitry 1008 may be hardware processing circuitry. The circuitry 1008 may be coupled to the transceiver 1002, which may be coupled to the transmit/receive element 1001. While FIG. 10 depicts the circuitry 1008 and the transceiver 1002 as separate components, the circuitry 1008 and the transceiver 1002 may be integrated together in an electronic package or chip.

In some embodiments, the MAC 1006 may be arranged to contend for a wireless medium during a contention period to receive control of the medium for a HEW control period and configure a HEW PPDU. In some embodiments, the MAC 1006 may be arranged to contend for the wireless medium based on channel contention settings, a transmitting power level, and a clear channel assessment (CCA) level.

The PHY 1004 may be arranged to transmit the HEW PPDU. The PHY 1004 may include circuitry for modulation/demodulation, upconversion/downconversion, filtering, amplification, etc. In some embodiments, the circuitry 1008 may include one or more processors. The circuitry 1008 may be configured to perform functions based on instructions being stored in a RAM or ROM, or based on special purpose circuitry. In some embodiments, the circuitry 1008 may be configured to perform one or more of the functions described herein in conjunction with FIGS. 1-10.

In some embodiments, two or more antennas 1001 may be coupled to the PHY 1004 and arranged for sending and receiving signals including transmission of HEW packets. The transceiver 1002 may transmit and receive data such as the HEW PPDUs and packets that include an indication that the HEW device 1000 should adapt the channel contention settings according to settings included in the packet. The memory 1010 may store information for configuring the other circuitry to perform the functions described in conjunction with FIGS. 1-10, such as generating a resource allocation for a bandwidth, transmitting the resource allocation to HEW stations 104, receiving the resource allocation, and operating in accordance with the resource allocation.

In some embodiments, the HEW device 1000 may be configured to communicate using OFDMA communication signals over a multicarrier communication channel. In some embodiments, the HEW device 1000 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the disclosed embodiments is not limited in this respect, as the HEW device 1000 may also be suitable to transmit and/or receive communications in accordance with other techniques and standards. In some embodiments, the HEW device 1000 may use 4× symbol duration of 802.11n or 802.11ac.

In some embodiments, the HEW device 1000 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a base station, a transmit/receive device for a wireless standard such as 802.11 or 802.16, or another device that may receive and/or transmit information wirelessly. In some embodiments, the portable wireless communication device may include one or more of a keyboard, a display, a non-volatile memory port, multiple antennas 1001, a graphics processor, an application processor, speakers, and other mobile device elements. The display may be an LCD screen including a touch screen.

The antennas 1001 may comprise one or more directional or omnidirectional antennas, including, for example, dipole antennas, monopole antennas, patch antennas, loop antennas, microstrip antennas, or other types of antennas suitable for transmission of RF signals. In some multiple-input multiple-output (MIMO) embodiments, the antennas 1001 may be effectively separated to take advantage of spatial diversity and the different channel characteristics that may result.

Although the HEW device 1000 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

The following examples pertain to further embodiments. Example 1 is a high-efficiency wireless local-area network (HEW) master station. The HEW master station may include circuitry configured to generate one or more resource allocations of a bandwidth for one or more HEW stations, wherein each resource allocation for a first portion of the bandwidth is a multiple of a basic resource allocation or the entire first portion of the bandwidth, and transmit the one or more resource allocations and a duration to the one or more HEW stations. The one or more resource allocations may be for one of the following group: an uplink transmission opportunity and a downlink data transmission from the HEW master station for a time based on the duration. The circuitry may be further configured to operate in accordance with orthogonal frequency division multiple access (OFDMA) and in accordance with the one or more resource allocations.

In Example 2, the subject matter of Example 1 can optionally include where each of the one or more resource allocations is one from the following group: 26 tones, 52 tones, 104 tones, and 242 tones for the bandwidth equal to 20 MHz; 26 tones, 52 tones, 104 tones, 242 tones, and 498 tones for the bandwidth equal to 40 MHz; and 26 tones, 52 tones, 104 tones, 242 tones, 498 tones, and 996 tones for the bandwidth equal to 80 MHz.

In Example 3, the subject matter of Examples 1 or 2 can optionally include where the one or more resource allocations includes one or more resource allocations for one or more subsequent portions of the bandwidth, and where each of the one or more resource allocations for the one or more subsequent portions of the bandwidth is the multiple of the basic resource allocation or an entire bandwidth of the subsequent portion of the bandwidth.

In Example 4, the subject matter of any of Examples 1-3 can optionally include where the one or more resource allocations includes at most one resource allocation for a second portion of the bandwidth that is at least as large as the first portion of the bandwidth.

In Example 5, the subject matter of Example 4 can optionally include where the basic resource allocation is 26 tones, the first portion of the bandwidth is 20 MHz, and the second portion of the bandwidth is 20 MHz.

In Example 6, the subject matter of Example 1 can optionally include where there is only one resource allocation for a third portion of the bandwidth that is at least as large as a bandwidth of the first portion and the second portion of the bandwidth combined, and where the third portion of the bandwidth is 40 MHz.

In Example 7, the subject matter of Example 1 can optionally include where there is only one resource allocation for a fourth portion of the bandwidth that is at least as large as a bandwidth of the first portion, the second portion, and the third portion of the bandwidth combined, and where the fourth portion of the bandwidth is 80 MHz.

In Example 8, the subject matter of Example 5 can optionally include where each of the one or more resource allocations for the one or more HEW stations for the first portion of the bandwidth comprises one of the following group: nine 26 tone allocations; four 26 tone allocations on a first side of the first portion, one 26 tone allocation that straddles a null, and two 52 tone allocations on a second side of the first portion; four 26 tone allocations on the first side of the first portion, one 26 tone allocation to straddle the null, and one 104 tone allocation on the second side of the first portion; one 26 tone allocation to straddle the null and four 52 tone allocations; one 26 tone allocation to straddle the null, two 52 tone allocations on the first side of the first portion, and one 104 tone allocation on the second side of the first portion; one 26 tone allocation to straddle the null and two 104 tone allocations, and one 242 tone allocation.

In Example 9, the subject matter of Example 8 can optionally include where each of the one or more resource allocations for the one or more HEW stations for the first portion of the bandwidth and the second portion of the bandwidth comprises one of the following group: a resource allocation for 20 MHz in the first portion of the bandwidth and one 242 tone allocation in the second portion of the bandwidth; and a single resource allocation of 498 tones that spans both the first portion of the bandwidth and the second portion of the bandwidth.

In Example 10, the subject matter of Example 1 can optionally include where each of the one or more resource allocations for the one or more HEW stations for the first portion of the bandwidth and the second portion of the bandwidth comprises one of the following group: a resource allocation for 20 MHz in the first portion of the bandwidth and one 242 tone allocation in the second portion of the bandwidth; and a single resource allocation of 484 tones that spans both the first portion of the bandwidth and the second portion of the bandwidth; and wherein each of the one or more resource allocations for the first portion, the second portion, and a third portion of 40 MHz comprises one of the following group: a resource allocation for the first portion and the second portion and one 498 tone allocation, and a single resource allocation of 996 tones.

In Example 11, the subject matter of any of Examples 1-10 can optionally include where the bandwidth is part of a 2.4 GHz range or part of a 5 GHz range.

In Example 12, the subject matter of any of Examples 1-11 can optionally include where the circuitry is further configured to transmit at a 4× longer symbol duration than a legacy 4 microseconds (μs) symbol duration.

In Example 13, the subject matter of any of Examples 1-12 can optionally include memory coupled to the circuitry.

In Example 14, the subject matter of any of Examples 1-13 can optionally include one or more antennas coupled to the circuitry.

Example 15 is a method performed on a high-efficiency wireless local-area network (HEW) master station. The method may include generating one or more resource allocations of a bandwidth for one or more HEW stations, wherein each resource allocation for a first portion of the bandwidth is a multiple of a basic resource allocation or the entire first portion of the bandwidth, and transmitting the one or more resource allocations and a duration to the one or more HEW stations. The method may further include transmitting to or receiving from the one or more HEW stations, in accordance with an uplink transmission opportunity or a downlink data transmission from the HEW master station for a time based on the duration, respectively. The transmitting to or receiving from may be in accordance with orthogonal frequency division multiple access (OFDMA) and in accordance with the one or more resource allocations.

In Example 16, the subject matter of Example 15 can optionally include wherein each of the one or more resource allocations is one from the following group: 26 tones, 52 tones, 104 tones, 242 tones for the bandwidth equal to 20 MHz; 26 tones, 52 tones, 104 tones, 242 tones, and 498 tones for the bandwidth equal to 40 MHz; and 26 tones, 52 tones, 104 tones, 242 tones, 498 tones, and 996 tones for the bandwidth equal to 80 MHz.

In Example 17, the subject matter of Examples 15 or 16 can optionally include where the one or more resource allocations includes one or more resource allocations for one or more subsequent portions of the bandwidth, and where each of the one or more resource allocations for the one or more subsequent portions of the bandwidth is the multiple of the basic resource allocation or an entire bandwidth of the subsequent portion of the bandwidth.

In Example 18, the subject matter of any of Examples 15-17 can optionally include where the one or more resource allocations includes at most one resource allocation for a second portion of the bandwidth that is at least as large as the first portion of the bandwidth.

In Example 19, the subject matter of Example 18 can optionally include where the basic resource allocation is 26 tones, the first portion of the bandwidth is 20 MHz, and the second portion of the bandwidth is 20 MHz.

Example 20 is a high-efficiency wireless local-area network (HEW) station. The HEW station may include circuitry configured to receive one or more resource allocations of a bandwidth and a duration. Each resource allocation for a first portion of the bandwidth may be a multiple of a basic resource allocation or the entire first portion of the bandwidth. The circuitry may be further configured to transmit to or receive from a HEW master station, in accordance with an uplink transmission opportunity or a downlink data transmission from the HEW master station for a time based on the duration, respectively, wherein the transmitting to or receiving from is in accordance with orthogonal frequency division multiple access (OFDMA) and in accordance with the one or more resource allocations.

In Example 21, the subject matter of Example 20 can optionally include where each of the one or more resource allocations is one from the following group: 26 tones, 52 tones, 104 tones, 242 tones for the bandwidth equal to 20 MHz; 26 tones, 52 tones, 104 tones, 242 tones, and 498 tones for the bandwidth equal to 40 MHz; and 26 tones, 52 tones, 104 tones, 242 tones, 498 tones, and 996 tones for the bandwidth equal to 80 MHz.

In Example 22, the subject matter of Examples 20 or 21 can optionally include where the one or more resource allocations includes at most one resource allocation for a second portion of the bandwidth that is at least as large as the first portion of the bandwidth.

In Example 23, the subject matter of any of Examples 20-22 can optionally include memory coupled to the circuitry, and one or more antennas coupled to the circuitry.

Example 24 is a non-transitory computer-readable storage medium that stores instructions for execution by one or more processors of a high-efficiency (HE) wireless local-area network (WLAN) (HEW) device. The instructions may be to configure the one or more processors to cause the HEW device to generate one or more resource allocations of a bandwidth for one or more HEW stations, where each resource allocation for a first portion of the bandwidth is a multiple of a basic resource allocation or the entire first portion of the bandwidth, and where there is only one resource allocation for a second portion of the bandwidth that is at least as large as the first portion of the bandwidth.

In Example 25, the subject matter of Example 24 can optionally include where the basic resource allocation is 26 tones, the first portion of the bandwidth is 20 MHz, and the second portion of the bandwidth is 20 MHz.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A wireless apparatus configured for high-efficiency (HE) operation, the apparatus comprising:
    memory; and
    processing circuitry coupled to the memory, the processing circuitry configured to:
        receive a trigger frame within a transmission opportunity (TXOP), the trigger frame including an allocation of resource units for uplink data transmission within the TXOP by a plurality of HE stations (STAs) including the wireless apparatus, the allocation including a single resource unit allocation for the wireless apparatus, wherein the wireless apparatus is configured to transmit on each of the following single resource units within a 20 MHz orthogonal frequency division multiple access (OFDMA) block:
            one of eight 26-tone resource units with two pilot tones and a 26-tone resource unit comprising 13-tones on both sides of a null tone;
            one of four 52-tone resource units with four pilot tones and the 26-tone resource unit comprising 13-tones on both sides of the null tone;
            one of two 106-tone resource units with four pilot tones and the 26-tone resource unit comprising 13-tones on both sides of the null tone; and
            one of one 242-tone resource unit with eight pilot tones; and
        generate, in response to the trigger frame, an uplink data unit in accordance with the single resource unit allocation, for transmission within the single resource unit allocation during the TXOP.

2. The wireless apparatus of claim 1, wherein the wireless apparatus is configured to transmit on each of the following single resource units within a 40 MHz OFDMA block the single resource units comprise:
    one of eighteen 26-tone resource units with two pilot tones;
    one of eight 52-tone resource units with four pilot tortes and two 26-tone resource units;
    one of four 106-tone resource units with four pilot tones and two 26-tone resource units;
    one of two 242-tone unit resource units with eight pilots; and
    one of one 484-tone resource unit, wherein the trigger frame includes signaling to allocate a single resource unit to each HE STA of the plurality of HE STAs.

3. The wireless apparatus of claim 1, wherein the wireless apparatus is configured to transmit on each of the following single resource units within a 80 MHz OFDMA block, the single resource units comprise:
    one of 37 26-tone resource units with two pilot tones;
    one of 16 52-tone resource units with four pilot tones;
    one of eight 106-tone resource units with four pilot tones;
    one of four 242-tone unit resource units with eight pilots; and
    one of two 484-tone resource units with sixteen pilots, wherein the trigger frame includes signaling to allocate a single resource unit to each HE STA of the plurality of HE STAs.

4. The wireless apparatus of claim 1, wherein the trigger frame is to trigger a response comprising transmission of the uplink data unit.

5. The apparatus of claim 4, wherein the processing circuitry is further configured to generate the uplink data unit, for transmission as part of one or more uplink multiuser data units, in accordance with one of a multi-user multiple-input multiple-output (MUMIMO) or a OFDMA technique, within the TXOP.

6. The wireless apparatus of claim 1 wherein the apparatus is an STA, and further comprises transceiver circuitry configured to:
    receive the trigger frame; and
    transmit the uplink data unit in accordance with the single resource allocation for the wireless apparatus, and wherein the processing circuitry is configured to decode the trigger frame determine a tone configuration for the single resource unit allocation for transmission of the uplink data unit.

7. The wireless apparatus of claim 6 further comprising one or ore antennas coupled to the transceiver circuitry.

8. A non-transitory computer-readable storage medium that stores instructions for execution by one or more processors of a wireless apparatus configured for high-efficiency (HE) operation, the instructions to configure the wireless apparatus to perform operations to:
receive a trigger frame within a transmission opportunity (TXOP), the trigger frame including an allocation of resource units for uplink data transmission within the TXOP by a plurality of HE stations (STAs) including the wireless apparatus, the allocation including a single resource unit allocation for the wireless apparatus, wherein the wireless apparatus is configured to transmit on each of the following single resource units within a 20 MHz orthogonal frequency division multiple access (OFDMA) block:
one of eight 26-tone resource units with two pilot tones and a 26-tone resource unit comprising 13-tones on both sides of a null tone;
one of four 52-tone resource units with four pilot tones and the 26-tone resource unit comprising 13-tones on both sides of the null tone;
one of two 106-tone resource units with four pilot tones and the 26-tone resource unit comprising 13-tones on both sides of the null tone; and
one of one 242-tone resource unit with eight pilot tones; and
generate, in response to the trigger frame, an uplink data unit in accordance with the single resource unit allocation, for transmission within the single resource unit allocation during the TXOP.

9. The non-transitory computer-readable storage medium of claim 8, wherein the wireless apparatus is configured to transmit on each of the following single resource units within a 40 MHz OFDMA block the single resource units comprise:
one of eighteen 26-tone resource units with two pilot tones;
one of eight 52-tone resource units with four pilot tones and two 26-tone resource units;
one of four 106-tone resource units with four pilot tones and two 26-tone resource units;
one of two 242-tone unit resource units with eight pilots; and
one of one 484-tone resource unit, wherein the trigger frame includes signaling to allocate a single resource unit to each HE STA of the plurality of HE STAs.

10. A method performed by a wireless apparatus configured for high-efficiency (HE) operation, the method comprising:
receive a trigger frame within a transmission opportunity (TXOP), the trigger frame including an allocation of resource units for uplink data transmission within the TXOP by a plurality of HE stations (STAs) including the wireless apparatus, the allocation including a single resource unit allocation for the wireless apparatus, wherein the wireless apparatus is configured to transmit on each of the following single resource units within a 20 MHz orthogonal frequency division multiple access (OFDMA) block:
one of eight 26-tone resource units with two pilot tones and a 26-tone resource unit comprising 13-tones on both sides of a null tone;
one of four 52-tone resource units with four pilot tones and the 26-tone resource unit comprising 13-tones on both sides of the null tone;
one of two 106-tone resource units with four pilot tones and the 26-tone resource unit comprising 13-tones on both sides of the null tone; and
one of one 242-tone resource unit with eight pilot tones; and
generating, in response to the trigger frame, an uplink data unit in accordance with the single resource unit allocation, for transmission within the single resource unit allocation during the TXOP.

11. The method of claim 10, wherein:
within a 40 MHz OFDMA block the single resource units comprise:
one of eighteen 26-tone resource units with two pilot tones;
one of eight 52-tone resource units with four pilot tones and two 26-tone resource units;
one of four 106 one resource units pilot tones and two 26-tone resource units;
one of two 242-tone unit resource units with eight pilots; and
one of one 484-tone resource unit, wherein the trigger frame includes signaling to allocate one of the single resource units to each HE STA of the plurality of HE STAs.

12. An apparatus of an access point configured for high-efficiency (HE) operation as a master station (STA), the apparatus comprising:
memory; and
processing circuitry coupled to the memory, the processing circuitry configured to:
configure a trigger frame to allocate resource units including an allocation of a single resource unit to each one of a plurality of HE stations (HE STAs) for uplink data transmission, the apparatus of the access point configured to allocate the resource units in accordance with each of the following:
a 20 MHz orthogonal frequency division multiple access (OFDMA) block comprising eight 26-tone resource units with two pilot tones and a 26-tone resource unit comprising 13-tones on both sides of a null tone;
the 20 MHz OFDMA block comprising 52-tone resource units with four pilot tones and the 26-tone resource unit comprising 13-tones on both sides of the null tone;
the 20 MHz OFDMA block comprising: two 106-tone resource units with four pilot tones and the 20 MHz OFDMA block comprising: the 26-tone resource unit comprising 13-tones on both sides of the null tone; and
the 20 MHz OFDMA block comprising: one 242-tone resource unit with eight pilot tones, wherein each HE STA is allocated the single resource unit within one 20 MHz OFDMA block; and
process one or more uplink data units received from at least some of the HE STAs within the 20 MHz OFDMA block, the uplink data units received, in response to the trigger frame, within a transmission opportunity (TXOP) obtained by the master station.

13. The apparatus of claim 12, wherein the apparatus of the access point is configured to allocate the resource units in accordance with each of the following:
a 40 MHz OFDMA block comprising eighteen 26-tone resource units with two pilot tones;
the 40 MHz OFDMA block comprising eight 52-tone resource units with four pilot tones and two 26-tone resource units;
the 40 MHz OFDMA block comprising four 106-tone resource units with four pilot tones and two 26-tone resource units;

the 40 MHz OFDMA block comprising two 242-tone unit resource units with eight pilots; and the 40 MHz OFDMA block comprising one 484-tone resource unit, wherein each HE STA is allocated the single resource unit within one 20 MHz OFDMA block or one 40 MHz OFDMA block.

14. The apparatus of claim 12, wherein the apparatus of the access point is configured to allocate the resource units in accordance with each of the following:

a 40 MHz OFDMA block comprising thirty-seven 26-tone resource units with two pilot tones;

the 40 MHz OFDMA block comprising sixteen 52-tone resource units with four pilot tones;

the 40 MHz OFDMA block comprising eight 106-tone resource units with four pilot tones;

the 40 MHz OFDMA block comprising four 242-tone unit resource units with eight pilots; and the 40 MHz OFDMA block comprising two 484-tone resource units with sixteen pilots, wherein each HE STA is allocated the single resource unit within one 20 MHz OFDMA block, one 40 MHz OFDMA block, or one 80 MHz OFDMA block.

15. The apparatus of claim 12, wherein the processing circuitry is further configured to: generate the trigger frame for transmission to the plurality of HE STAs, the trigger frame to include signaling to allocate the resource units within the 20 MHz OFDMA block, wherein a single one of the resource units is allocated to each of the HE STAs of the plurality.

16. The apparatus of claim 15 wherein the trigger frame is configured for transmission within the TXOP, the trigger frame to trigger a response comprising transmissions of the uplink data units by the HE STAs.

17. The apparatus of claim 16 wherein the uplink data units comprise uplink multi-user data units received from the HE STAs within the TXOP, and wherein the processing circuitry is further configured to process, in accordance with one of a multi-user multiple-input multiple-output (MU-MIMO) or an OFDMA technique, within the TXOP, one or more of the uplink multi-user data units from at least some of the HE STAs.

18. The apparatus of claim 16 further comprising transceiver circuitry configured to:

transmit the trigger frame including signaling to allocate the resource units; and receive the uplink data units.

19. The apparatus of claim 18 further comprising two or more antennas coupled to the transceiver circuitry.

20. A non-transitory computer-readable storage medium that stores instructions for execution by one or more processors of an apparatus of an access point configured for high efficiency (HE) operation as a master station, the instructions to configure the apparatus to perform operations to:

configure a trigger frame to allocate resource units including an allocation of a single resource unit to each one of a plurality of HE stations (HE STAs) for uplink data transmission, the apparatus of the access point configured to allocate the resource units in accordance with each of the following:

a 20 MHz orthogonal frequency division multiple access (OFDMA) block comprising eight 26-tone resource units with two pilot tones and a 26-tone resource unit comprising 13-tones on both sides of a null tone;

the 20 MHz OFDMA block comprising 52-tone resource units with four pilot tones and the 26-tone resource unit comprising 13-tones on both sides of the null tone;

the 20 MHz OFDMA block comprising: two 106-tone resource units with four pilot tones and the 20 MHz OFDMA block comprising: the 26-tone resource unit comprising 13-tones on both sides of the null tone; and the 20 MHz OFDMA block comprising: one 242-tone resource unit with eight pilot tones, wherein each HE STA is allocated the single resource unit within one 20 MHz OFDMA block; and process one or more uplink data units received from at least some of the HE STAs within the 20 MHz OFDMA block, the uplink data units received, in response to the trigger frame, within a transmission opportunity (TXOP) obtained by the master station.

21. The non-transitory computer-readable storage medium of claim 20, wherein the instructions further configure the apparatus to: generate the trigger frame for transmission to the plurality of HE STAs, the trigger frame to include signaling to allocate the resource units within the 20 MHz OFDMA block, wherein a single one of the resource units is allocated to each of the HE STAs of the plurality.

* * * * *

UNITED STATES PATENT AND TRADEMARK OFFICE
CERTIFICATE OF CORRECTION

PATENT NO. : 9,924,510 B2
APPLICATION NO. : 14/670924
DATED : March 20, 2018
INVENTOR(S) : Azizi et al.

Page 1 of 1

It is certified that error appears in the above-identified patent and that said Letters Patent is hereby corrected as shown below:

In the Claims

In Column 14, Line 27, in Claim 2, delete "tortes" and insert --tones-- therefor In Column 14, Line 56, in Claim 5, delete "a" and insert --an-- therefor In Column 14, Line 59, in Claim 6, after "an", insert --HE--

In Column 14, Line 65, in Claim 6, after "frame", insert --to--

In Column 15, Line 2, in Claim 7, delete "ore" and insert --more-- therefor

In Column 16, Line 17, in Claim 11, delete "106 one" and insert --106-tone-- therefor In Column 16, Line 17, in Claim 11, after "units", insert --with four--

In Column 16, Line 41, in Claim 12, after "comprising", insert --:--

In Column 18, Line 20, in Claim 20, after "comprising", insert --:--

Signed and Sealed this
Eleventh Day of June, 2019

Andrei Iancu
*Director of the United States Patent and Trademark Office*